United States Patent Office 3,471,535
Patented Oct. 7, 1969

3,471,535
CONVERSION OF HYDROXYALKANESULFO-
NATES AND ALKENESULFONATES TO
CARBOXYLATES
Donald N. De Mott, Midland, Mich., assignor to The
Procter & Gamble Company, Cincinnati, Ohio, a
corporation of Ohio
No Drawing. Filed June 7, 1967, Ser. No. 644,122
Int. Cl. C07c 51/00, 53/22
U.S. Cl. 260—413                                3 Claims

ABSTRACT OF THE DISCLOSURE

Conversion of hydroxyalkanesulfonates, alkenesulfonates, and mixtures thereof to carboxylates having one less carbon atom than the sulfonate starting material by heating the sulfonate to a temperautre of 150–350° C. with a strong base for 30 minutes to six hours.

Background of the invention

This invention relates to conversion of hydroxyalkanesulfonates, alkenesulfonates, and mixtures thereof to carboxylates of one less carbon atom than the starting material. More specifically, this invention relates to the reaction of a strong base with a sulfonate containing a hydroxyl group or a double carbon-to-carbon bond, to form a carboxylate of one less carbon atom than the sulfonate starting material. By "sulfonate" or "carboxylate," it is intended to include both the salt and acid forms.

Conversion of one organic acid into another has long been a matter of interest to organic chemists. In 1840, F. Varrentrapp reported in Liebigs Ann. 35, 196, that oleic acid could be converted into palmitic acid and acetic acids by heating with potassium hydroxide. This reaction is now known as the "Varrentrapp Reaction," by which a variety of carboxylates containing ethylenic unsaturation are converted into carboxylates containing two less carbon atoms, with hydrogen and acetate as by-products. (See, for example, R. G. Ackman et al., "Organic Reactions in Strong Alkalis-I. Fission of Ethylenic Acids (The Varrentrapp Reaction)," Tetrahedron 8, 221–38 [1960].)

F. Püschel et al. in "Higher Molecular Aliphatic Sulfonic Acids-I. 2-Hydroxy-1-n-Alkanesulfonic Acids," Chem. Ber. 97, 2903–16 (1964) have reported a reaction between β-ketoalkanesulfonates with strong alkali to form carboxylate compounds. The present invention is distinguished from the Püschel et al. experiments in several respects including the lower oxidative state of the hydroxyalkanesulfonates and alkenesulfonates as well as the absence of an oxidizing reaction system that would convert these compounds to the higher oxidative state of Püschel's keto-compounds.

It is, therefore, an object of this invention to provide novel methods of producing carboxylates from readily available starting materials. More specifically, it is an object of this invention to provide novel methods of producing from hydroxyalkanesulfonates, alkenesulfonates and mixtures thereof, carboxylates having a single carbon atom less than the starting material. Other objects will become apparent from the detailed description given below.

Summary of the invention

It has now been found, according to the present invention, that compounds of the general formula $$R\text{—}SO_3^\ominus M^\oplus$$

wherein R represents a hydroxyalkyl or an alkenyl group, and mixtures of such compounds, containing from about 12 to about 20 carbon atoms and M represents a cation selected from the group consisting of sodium, potassium, and lithium cations, when heated with a strong inorganic or organic base to a temperature of about 150° C. to about 350° C. for about 30 minutes to about six hours, produce carboxylates of the general formula $$R'CO_2^\ominus M^\oplus$$

wherein R' is an alkyl group containing two fewer carbon atoms than R in the starting material (i.e., the product $R'CO_2^\ominus M^\oplus$ contains one less carbon atom than R) and M is as defined above. A diene compound may also be formed during the reaction which contains the same number of carbon atoms as the starting material. Preferred starting materials are indicated in the detailed description which follows.

Detailed description

The detailed description which follows includes (1) a description of the starting materials of the process of this invention; and (2) a description of the process itself.

(1) *Starting materials.*—The reactants in the process of this invention consist of (a) a hydroxyalkanesulfonate or an alkenesulfonate; and (b) a strong organic or inorganic base.

(a) *Hydroxyalkanesulfonate or alkenesulfonate.*—The primary starting material of the process of this invention is a hydroxyalkanesulfonate, an alkenesulfonate, or a mixture thereof, of the general formula $R\text{—}SO_3^\ominus M^\oplus$.

In the above formula, R represents a hydroxyalkyl or an alkenyl group containing from about 12 to about 20 carbon atoms; M represents a cation selected from the group consisting of sodium, potassium, and lithium cations. Mixtures of compounds in which R represents various hydroxyalkyl or alkenyl groups can also be used. It is preferred that R be a 2-hydroxyalkyl containing from about 14 to about 18 carbon atoms or 2-alkenyl containing from about 14 to about 18 carbon atoms. As between 2-hydroxyalkyl and 2-alkenyl groups, 2-hydroxyalkyl groups are preferred, as better yields are obtained when they are used.

Specific examples of hydroxyalkanesulfonates and alkenesulfonates which can be used in the process of this invention include the following:

Lithium 2-hydroxyoctadecanesulfonate,
   $C_{16}H_{33}\text{—}CHOH\text{—}CH_2SO_3^\ominus Li^\oplus$;
Lithium 4-pentadecenesulfonate,
   $C_{10}H_{21}\text{—}CH=CH\text{—}(CH_2)_3\text{—}SO_3^\ominus Li^\oplus$;
Potassium 3-heptadecenesulfonate,
   $C_{13}H_{27}\text{—}CH=CH\text{—}(CH_2)_2\text{—}SO_3^\ominus K^\oplus$;
Potassium 2-hexadecenesulfonate,
   $C_{13}H_{27}\text{—}CH=CH\text{—}CH_2\text{—}SO_3^\ominus K^\oplus$;
Potassium 3-hydroxydodecanesulfonate,
   $C_9H_{19}\text{—}CHOH\text{—}(CH_2)_2\text{—}SO_3^\ominus K^\oplus$;
Sodium 4-hydroxyeicosanesulfonate,
   $C_{16}H_{33}\text{—}CHOH\text{—}(CH_2)_3\text{—}SO_3^\ominus Na^\oplus$;
Sodium 2-hydroxyhexadecanesulfonate,
   $C_{14}H_{29}\text{—}CHOH\text{—}CH_2\text{—}SO_3^\ominus Na^\oplus$; and
Sodium 2-tetradecenesulfonate,
   $C_{11}H_{23}\text{—}CH=CH\text{—}CH_2SO_3^\ominus Na^\oplus$.

These compounds can be prepared in a variety of ways. The 2-hydroxyalkanesulfonates can be made, for example, from sodium sulfite and either 1,2-halohydrins $$(RCHOHCH_2X);$$

2,1-bromohydrins $(RCHBrCH_2OH)$; or 1,2-epoxides $$(R\text{—}\overset{O}{\overset{|}{C}H}\text{—}CH_2)$$

as described by F. Püschel et al. in Chem. Ber. 97, 2903–16 (1964). They can also be made from 1,2-epoxides and sodium bisulfiite, according to the method of A. Lambert et al. (J. Chem. Soc. [London], 1949, 46). Alkenesulfonates can also be made from 1,2-epoxides, using successively sodium bisulfite, phosphorus pentachloride, and sodium carbonate as reagents (A. Lambert et al.). Other methods of synthesis are given by A. F. Turbak, in U.S. Patent 3,072,618, granted Jan. 8, 1963; by F. A. Bordwell et al., in J. Am. Chem. Soc. 76, 3952 (1954); and by A. Kessler and P. F. Pflaumer in U.S. patent application Ser. No. 561,352, filed June 29, 1966.

(b) *Strong base.*—In addition to hydroxyalkanesulfonate or alkenesulfonate, the process of the present invention requires a strong base. Strong inorganic bases, such as lithium hydroxide, potassium hydroxide, and sodium hydroxide can be used, and are preferred; but strong organic bases such as potassium tert-butoxide, $KOC(CH_3)_3$, can also be used. The use of an anhydrous base is not required; concentrated aqueous base of about 85% or higher concentration can also be used.

(2) *Reaction conditions.*—According to the present invention, compounds as described above are heated to about 150° C. to about 350° C. for about 30 minutes to about six hours; it is preferred to heat the reactants for about 30 minutes to about one hour at about 270° C. to about 340° C. with the best results being obtained with a temperature of about 285° C. to about 300° C. The reaction can be carried out under an atmosphere of air or an inert gas such as argon or nitrogen; it is preferred to exclude oxygen, in order to increase the yield. It is preferred that the reactants be well mixed before heating, but mixing during the reaction is unnecessary.

The molar ratio of strong base to hydroxyalkanesulfonate or alkenesulfonate can vary from about 1:1 to about 20:1; about 15:1 to about 20:1 is preferred. At least 1 mole of base is required to react with the sulfonate starting material, and excess base gives better yields; increasing the amount of base to more than about 20 moles per mole of sulfonate starting material is unnecessary, however.

The product of this invention (carboxylic salts and dienes) can be purified by conventional means illustrated in the examples to yield pure carboxylic acids. Since the commonest starting materials will be derived from naturally occurring sources, and therefore will have even numbers of carbon atoms, and since the process of this invention yields carboxylic acid salts having one less carbon atom than the starting material, the usual product of this invention will be a carboxylic acid salt having an odd number of carbon atoms. This invention, therefore, represents a novel and convenient route to carboxylic acids having an odd number of carbon atoms. The invention is not so limited, however. The carboxylic acids, whether having an even or odd number of carbon atoms, are versatile chemicals of wide utility. They can be made into water soluble salts by neutralization with a base, for example, with sodium or ammonium hydroxide, to yield soduim or ammonium carboxylates. These salts are useful as soaps and emulsifiers. The acids can be converted to acyl chlorides having the same number of carbon atoms as the acid, by reaction with phosphorus trichloride or pentachloride, or with sulfonyl chloride; such acyl chlorides are widely used reagents to introduce acyl groups into an organic structure. The acids can be esterified with alcohols to yield esters, which are valuable flavor and aroma producing compounds. They can be made into amides (by dehydration of the ammonium salt), or into alcohols by (reduction, such as with lithium aluminum hydride), or into a wide variety of other known and useful chemical compounds.

The following examples illustrate the process of the present invention.

EXAMPLE I

In a mortar and pestile, 5.00 grams of sodium 2-hydroxyhexadecanesulfonate and 15 grams of anhydrous potassium hydroxide pellets were thoroughly ground together. This gave a ratio of about 17 moles base per mole of sulfonate. The mixture was then poured into a 50 milliliter stainless steel standard taper flask, which was equipped with a distillation head and gas flushing tube. The apparatus was flushed with argon for five minutes and immersed in a Woods' metal bath at 300° C. for 30 minutes. During this time a slow stream of argon was passed through the system. After three minutes a white vapor appeared in the condenser followed by distillation of two immisicible liquids after seven minutes. The flask was cooled to room temperature and the contents dissolved in 500 milliliters of distilled water. The water layer was extracted twice with 500 milliliter portions of pentane, acidified to pH 1 with concentrated hydrogen chloride and reextracted with pentane to yield 1.83 grams (about 50% yield) of crude pentadecanoic acid, identified by gas-liquid chromatography comparison of the methyl ester with an authentic sample of methyl pentadecanoate. 1.30 grams of a diene of the formula $C_{16}H_{30}$ were also obtained.

The product, purified and obtained in the form of a carboxylic acid, can be converted back into a pure salt, useful as a soap or emulsifier, as described above; or into acyl chloride, esters, amides, alcohols, etc.

EXAMPLES 2–5

The procedure of Example 1 was modified by varying the reaction temperature, with the following results:

| Example | Temperature (° C). | Yield of $C_{14}H_{29}CO_2H$ (grams) |
|---|---|---|
| 2 | 270 | 1.60 |
| 3 | 285 | 1.90 |
| 4 | 315 | 1.35 |
| 5 | 340 | 1.17 |

These five examples represented about 30% to about 50% of theoretical yield; the best yields are in Examples 1 and 3 (300° C. and 285° C.).

EXAMPLES 6–7

The procedure of Example 1 was modified by eliminating the flushing with argon and the passing of argon through the system, so that the reaction mixture was exposed to air during heating. The quantities of sodium 2-hydroxyhexadecanesulfonate and potassium hydroxide were reduced to three-fifths the amount used in Examples 1–5, and the reaction time was varied, with the following results:

| Example | Reaction time | Yield of $C_{14}H_{29}CO_2H$ (grams) |
|---|---|---|
| 6 | 30 minutes | 1.08 |
| 7 | 1 hour | .94 |

These two examples represented between 40% and 50% of theoretical yield.

In any of Examples 1–7, the molar ratio of potassium hydroxide to 2-hydroxyhexadecanesulfonate was about 17:1, but this ratio can be varied between 15:1 and 20:1 with substantially equivalent results. Ratios as low as 1:1 can be used, but this is not preferred, since lower yields are obtained.

There can be substituted for potassium hydroxide another strong base, such as sodium hydroxide, lithium hydroxide, or potassium tert-butoxide, again with substantially equivalent results. For sodium 2-hydroxyhexadecanesulfonate, there can be substituted lithium, potassium, sodium hydroxyhexadecanesulfonates; lithium, potassium, or sodium dodecenesulfonates; or mixtures thereof, with substantially equivalent results.

EXAMPLE 8

A mixture of alkenesulfonates and hydroxyalkanesulfonates was prepared according to the method of Lambert et al., reported in J. Chem. Soc. (London) 1949, 46. This mixture contained about 85% alkenesulfonates, of which most was potassium 2-hexadecenesulfonate,

$C_{13}H_{27}CH{=}CH{-}CH_2SO_3K$ and about 15% hydroxyalkanesulfonates, which was mostly a mixture of potassium 2-, 3-, and 4-hydroxyhexadecanesulfonates. 25 grams of this mixture and 9 grams of potassium tert-butoxide (molar ratio of base to sulfonate about 1.2:1), together with 50 milliliters of tert-butyl alcohol were combined in a glass autoclave liner. The components were placed in an autoclave under a nitrogen atmosphere for six hours at 150° C. After cooling, the reaction mixture was dissolved in about 500 milliliters of water, and the water solution was extracted with three 250 milliliter portions of diethyl ether. Water and ether were evaporated on a steam bath, and the solution was then extracted with acetone and filtered. The soluble portion of the solids left upon evaporation of acetone was then dissolved in a 20% ethanol-80% water solution. This ethanol-water solution was then acidified to pH 3 with HCl, causing a precipitate to form. The precipitate was then washed into a flask with acetone, and the acetone was evaporated to yield 3.8 grams of pentadecanoic acid, identified (1) by methyl esterification and gas-liquid chromatographic comparison with known methyl pentadecanoate, and (2) by elemental analysis.

What is claimed is:
1. A process for producing carboxylates, comprising the step of heating
    (1) a salt selected from the group consisting of lithium, potassium, and sodium hydroxyalkanesulfonates containing from about 12 to about 20 carbon atoms, and lithium, potassium, and sodium alkenesulfonates containing from about 12 to about 20 carbon atoms and mixtures thereof, with
    (2) a strong organic or inorganic base selected from the group consisting of lithium hydroxide, potassium hydroxide, sodium hydroxide and potassium tert.-butoxide, wherein the molar ratio of said strong base to said salt ranges from about 1:1 to about 20:1, at a temperature of about 150° C. to about 350° C., for about 30 minutes to about six hours.
2. The process of claim 1, wherein
    (1) said salt is selected from the group consisting of lithium, potassium, and sodium 2-hydroxyalkanesulfonates containing about 16 carbon atoms; lithium, potassium, and sodium 2-alkenesulfonates containing about 16 carbon atoms; and mixtures thereof;
    (2) said strong base is selected from the group consisting of lithium hydroxide, potassium hydroxide, sodium hydroxide, and potassium tert-butoxide;
    (3) the molar ratio of said strong base to said starting material ranges from about 15:1 to about 20:1, and
    (4) the reactants are heated to a temperature of about 270° C. to about 340° C. for about 30 minutes to about one hour.
3. The process of claim 1, wherein
    (1) said salt is sodium 2-hydroxyhexadecanesulfonate;
    (2) said strong base is potassium hydroxide;
    (3) the molar ratio of potassium hydroxide to sodium 2-hydroxyhexadecanesulfonate is about 17:1; and
    (4) the reactants are heated to a temperature of about 285° C. to about 300° C., for about 30 minutes to about one hour.

References Cited
UNITED STATES PATENTS 3,228,980  1/1966  Weil et al. _____ 260—413 XR
3,297,579  1/1967  Weil et al. _____ 260—413 XR OTHER REFERENCES
Püschel et al., Ber. 97, pp. 2903–2916.

BERNARD HELFIN, Primary Examiner
HOWARD T. MARS, Assistant Examiner